(12) United States Patent
Dreiner et al.

(10) Patent No.: US 10,014,094 B2
(45) Date of Patent: Jul. 3, 2018

(54) CABLE AND METHOD FOR THE PRODUCTION THEREOF

(71) Applicant: LEONI Kabel Holding GmbH, Nuremberg (DE)

(72) Inventors: Michael Dreiner, Wipperfuerth (DE); Christian Eck, Wipperfuerth (DE); Winfried Freyth, Schwelm (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 15/186,605

(22) Filed: Jun. 20, 2016

(65) Prior Publication Data

US 2016/0314874 A1 Oct. 27, 2016

Related U.S. Application Data

(63) Continuation of application No. PCT/EP2014/078781, filed on Dec. 19, 2014.

(30) Foreign Application Priority Data

Dec. 19, 2013 (DE) ........................ 10 2013 226 790

(51) Int. Cl.
| | |
|---|---|
| *H01B 7/00* | (2006.01) |
| *H01B 7/38* | (2006.01) |
| *C08K 3/36* | (2006.01) |
| *C08L 83/04* | (2006.01) |
| *H01B 3/46* | (2006.01) |

(Continued)

(52) U.S. Cl.
CPC ............... *H01B 7/38* (2013.01); *C08K 3/24* (2013.01); *C08K 3/36* (2013.01); *C08L 83/04* (2013.01); *H01B 1/023* (2013.01); *H01B 3/46* (2013.01); *H01B 7/0275* (2013.01); *H01B 7/1885* (2013.01); *H01B 13/141* (2013.01)

(58) Field of Classification Search
CPC ...................................................... H01B 7/0208
USPC ....................................... 174/120 R, 120 SC
See application file for complete search history.

(56) References Cited

U.S. PATENT DOCUMENTS

| 4,164,617 A | * | 8/1979 | Van Kesteren | .......... H01B 3/46 |
| | | | | 174/23 C |
| 4,800,124 A | | 1/1989 | Davis et al. | |
| | | | (Continued) | |

FOREIGN PATENT DOCUMENTS

| CA | 2 857 698 A1 | 6/2013 |
|---|---|---|
| CN | 1613937 A | 5/2005 |

(Continued)

OTHER PUBLICATIONS

Chinese Office Action for Chinese Application No. 201480068871.5 dated Dec. 27, 2016—English translation.

(Continued)

*Primary Examiner* — Chau N Nguyen
(74) *Attorney, Agent, or Firm* — Muncy, Geissler, Olds & Lowe, P.C.

(57) ABSTRACT

A cable having an electrical conductor, a silicone sheath surrounding the conductor, and a separation layer between the conductor and the silicone sheath. Said cable is characterized in that the separation layer is made of a silicone material that is less adhesive to the conductor than the material of the silicone sheath. The invention further relates to a method for manufacturing a cable of said type.

7 Claims, 1 Drawing Sheet

(51) Int. Cl.
    *H01B 7/02*     (2006.01)
    *H01B 7/18*     (2006.01)
    *C08K 3/24*     (2006.01)
    *H01B 1/02*     (2006.01)
    *H01B 13/14*     (2006.01)

(56) References Cited

U.S. PATENT DOCUMENTS

| | | | | |
|---|---|---|---|---|
| 5,861,578 A | * | 1/1999 | Hake | H01B 3/421 |
| | | | | 174/120 R |
| 7,105,749 B2 | | 9/2006 | Belli et al. | |
| 9,536,635 B2 | * | 1/2017 | Polasky | H01B 3/28 |
| 2014/0083739 A1 | * | 3/2014 | Jeker | H01B 1/24 |
| | | | | 174/120 SC |
| 2014/0263289 A1 | | 9/2014 | Mosebach et al. | |

FOREIGN PATENT DOCUMENTS

| | | | |
|---|---|---|---|
| CN | 1625787 A | | 6/2005 |
| DE | 37 22 755 A1 | | 1/1988 |
| DE | 197 17 645 A1 | | 10/1998 |
| DE | 197 17 645 C2 | | 1/2001 |
| EP | 0 978 128 B1 | | 2/2003 |
| EP | 2 711 934 A1 | | 3/2014 |
| GB | 870 583 A | | 6/1961 |
| JP | 2001-176330 A | | 6/2001 |
| WO | WO 2013/079201 A1 | | 6/2013 |

OTHER PUBLICATIONS

Namitha et al., "Effect of micro- and nano-fillers on the properties of silicone rubber-alumina flexible microwave substrate," Ceramics Int'l, vol. 39, No. 6, pp. 7077-7087 (Feb. 26, 2013).
Canadian Office Action for Canadian Application No. 2,933,987 dated May 15, 2017.
Chinese Office Action for Chinese Application No. 201480068871.5 dated Aug. 28, 2017 with English translation.
Japanese Office Action for Japanese Application No. 2016-541383 dated Sep. 14, 2017 with English translation.

* cited by examiner

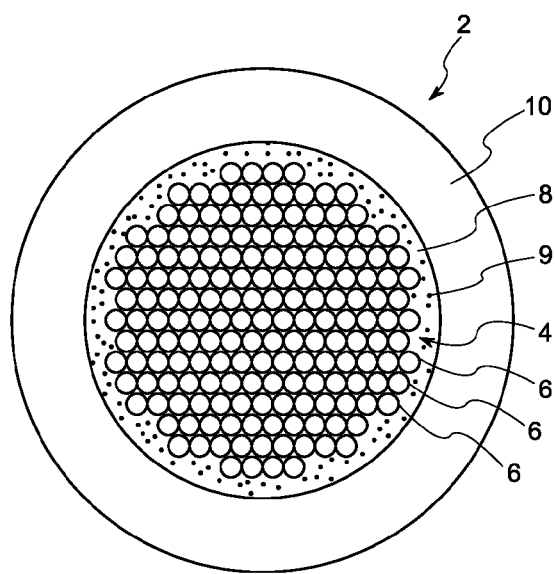

CABLE AND METHOD FOR THE PRODUCTION THEREOF

This nonprovisional application is a continuation of International Application No. PCT/EP2014/078781, which was filed on Dec. 19, 2014, and which claims priority to German Patent Application No. 10 2013 226 790.8, which was filed in Germany on Dec. 19, 2013, and which are both herein incorporated by reference.

BACKGROUND OF THE INVENTION

Field of the Invention

The present invention relates to a cable having an electrical conductor, having a silicone sheath surrounding satheid conductor, and having a separation layer that is located between the conductor and the sheath. In addition, the invention relates to a method for manufacturing such a cable.

Description of the Background Art

A cable normally includes at least one conductor that is surrounded by a sheath, in particular for protection or for insulation. The conductor is typically a wire or a strand made of metal, whereas the sheath is often made of a plastic. During preparation of the cable, portions of the sheath are removed again, in which process the effort depends materially on the adhesion of the sheath to the conductor, and thus in particular on the material combinations chosen.

Silicones are especially suitable materials for producing a sheath for a cable, in particular because of their chemical and physical properties. Especially in the case of a silicone sheath of this nature, however, the result usually is an especially strong adhesion to or bonding with the sheathed conductor. This effect is especially pronounced with conductors made of aluminum. During the subsequent further processing, in particular during preparation and stripping, separation of the silicone sheath is made significantly more difficult by the strong adhesion, since silicone residues usually remain on the conductor in this process. Such residues then interfere with any subsequent crimping or welding process, in particular.

In order to avoid this, a separation layer made of paper, PET nonwoven fabric, PET film, PTFE film, or films of similar materials, can be applied to the conductor during manufacture of the cable. In the finished cable, the separation layer then forms a separator that is arranged spatially between the conductor and the sheath in such a manner that direct adjacency of the two materials, and hence a joining or adhesion of the same, is prevented. Even in this design, however, portions of the films often remain after stripping, and must then be laboriously removed, for example by hand.

SUMMARY OF THE INVENTION

It is therefore an object of the invention to provide a cable with which a preparation and stripping can be accomplished in a simplified manner. In this context, the conductor of the cable should be strippable such that it is as residue-free as possible. The need for additional cleaning of residue from the stripped conductor should be avoided. In addition, a method for manufacturing a corresponding cable is to be specified.

In an exemplary embodiment according to the invention, provision is made for the cable to have, located between the silicone sheath and the conductor, a separation layer that is made of a silicone material that has a lower adhesion to the electrical conductor as compared with the material of the silicone sheath. In other words, in the conventional case, which is to say in particular without the separation layer, the silicone sheath adheres more strongly to the conductor than the separation layer does in the cable described here.

The advantages achieved with the invention includes that a separation layer that is similar to the silicone sheath but does not adhere to the conductor is applied instead of a separation layer made of the materials normally used. As a result of this material selection, the silicone sheath and the separation layer are joined to one another, in particular to produce a combined cable sheath whose adhesion to the conductor is significantly reduced or even avoided as compared to the silicone sheath alone. Moreover, the separation layer advantageously is automatically removed together with the silicone sheath during stripping or sheath removal. The bond between the separation layer and the silicone sheath results in particular from the fact that they are each made of a silicone or silicone-like material, and thus adhere especially well to one another. Both the silicone sheath and the silicone material of the separation layer is formed at least primarily of a silicone, in particular a silicone elastomer. The outer sheath and separation layer are different from one another, however. In particular, the separation layer adheres to the conductor significantly less well than the material of the outer sheath does. The separation layer thus advantageously forms a layer that adheres especially poorly to the conductor, which is to say toward the inside, and especially strongly to the silicone sheath, which is to say toward the outside. As a result, it is possible to expose the conductor with no residue during preparation or stripping. This eliminates, in particular, an otherwise added cleaning step in which the stripped part of the conductor is cleaned of remaining residues of the separation layer and/or of the silicone sheath.

An especially advantageous bonding of the separation layer and silicone sheath can be achieved in an embodiment by the means that the separation layer can be integrally joined to the silicone sheath. Such an integral joint can be achieved especially simply as a result of the specific material selection. Since both the silicone sheath and the separation layer are made from a silicone, which is to say in particular also a silicone-like material, it is in particular also possible during manufacture to bond these two parts of the cable to one another especially strongly. The separation layer and the silicone sheath then are usefully inseparable, which is to say they are bonded to one another such that they cannot later be separated, or at least have a strong adhesion to one another such that when the silicone sheath is stripped, the separation layer is reliably removed with it. High adhesion is understood here in particular as a stronger adhesion than the adhesion between the separation layer and conductor. Accordingly, because of this lower adhesion to the conductor, or even lack of adhesion to it, no residues remain on it.

A silicone material can be understood here, for example, as a material that is based on a silicone, is silicone-like, or is an actual silicone. In particular, it is possible to use the same silicone as starting material for the silicon material as for the silicone sheath. Alternatively, it is possible to use two different silicones. In this context, such silicones as are in the solid state at room temperature are preferably used for the silicone sheath as well as also, in particular, for the separation layer. The silicone material expediently has a higher density than the material of the silicone sheath. This density is preferably in the range from approximately 1.5 to 1.8 $g/cm^3$. In comparison with the material of the silicone sheath, which is made, for example, of conventional silicone, which typically has a density in the range from 1.1 to 1.2 g/cm³, the density of the separation layer therefore is generally higher than the density of the silicone sheath by one quarter to approximately one half. As a result of the higher density, a higher hardness is also achieved, in particular, which fosters the low adhesion to the conductor.

Advantageously, the silicone material can be a material provided with at least one filler, in particular silicone enriched with filler. The filler thus is embedded in the silicone, in particular homogeneously distributed through the volume. The silicone thus forms, as it were, a matrix or carrier in which the filler, which is to say the individual particles, are embedded. An addition or admixing of a filler allows, in particular, a suitable adjusting of the density of the silicone material for the separation layer. Moreover, it is possible by means of the filler to advantageously adjust the adhesion and bonding behavior of the separation layer with regard to both the silicon sheath and the conductor. Accordingly, an addition of the filler usefully occurs in such a manner that adhesion with respect to the silicone sheath is increased or with respect to the conductor is reduced, preferably even both, as compared to the case without filler.

The filler can be a mineral (solid) substance, for example, a powdered substance. A substance of this nature advantageously contributes in particular to reducing the adhesion of the silicone material to the conductor of the cable, which is to say that the adhesion to the conductor is considerably reduced in general by the filler. At the same time, the use of the silicone material virtually as a carrier for the filler also advantageously ensures a direct integral connection to the silicone sheath, which is to say in particular a bond with the silicone sheath. The filler preferably has a particle size in the μm range, for example in the range of tens of μm.

A silicon dioxide or a silicic acid can be used as filler. Such fillers are, for example, silicon-based mineral substances that consequently can be added to the silicone material especially well. Preferably a pyrogenic silicic acid is used, such as is known under the trade name AEROSIL from Evonik Industries, for example.

The proportion of filler in the silicone material results in particular from the increased density as compared to pure silicone. The proportion of filler can be a minimum of 10 percent by weight and a maximum of 70 percent by weight. In a suitable improvement, the proportion can be a minimum of 30 percent by weight and a maximum of 60 percent by weight.

Expediently, in this design the same silicone, in particular a silicone elastomer, is used as silicone for the silicone sheath on the one hand and for the carrier for the filler on the other hand. The silicone sheath and the separation layer in the preferred variant thus differ only by the fillers.

A heat-curing silicone based on diorgano(poly)siloxanes can be used as a silicone substance for the silicone material and/or for the silicone sheath. Preferably, therefore, the silicone sheath can be made of this heat-curing silicone and the silicone material can be likewise made from a silicone matrix of, for example, the same heat-curing silicone, in which the fillers are embedded.

This invention relates to heat-curing silicones based on diorgano(poly)siloxanes, which are generally referred to as HTV (high temperature vulcanizing) silicones. These silicones can be the hitherto known linear, branched, or cyclic organopolysiloxanes as well as hydrocarbon-siloxane copolymers, which on average have more than one silicon carbon-bonded organic radical with terminal aliphatic carbon-carbon double bond. Examples for the organopolysiloxanes used according to the invention are those including units with the formula R1SiOR2, where R can be identical or different and indicates aliphatic saturated, optionally substituted bonded hydrocarbon radicals with 1 to 18 carbon atoms, R2 can be identical or different and indicates bonded organic radicals with terminal aliphatic carbon-carbon double bond. Crosslinking agents, preferably from the group of alkyl or aryl peroxides, are incorporated for crosslinking. Examples of alkyl peroxides include dicumyl peroxide, di-tert butyl peroxide, and 2,5-di-tert-butylperoxy-2,5-dimethyl hexane. Examples of aryl peroxides include benzoyl peroxide, bis(2.4 dichlorobenzoyl) peroxide, and bis(4-methyl benzoyl) peroxide.

In an embodiment, the conductor can be made of aluminum or an aluminum alloy. In this way, the cable can be manufactured especially economically, in particular more economically than is the case for a conductor made of copper. As a result of the separation layer, an adhesion of the silicone sheath to the aluminum conductor is then advantageously avoided, and the conductor can be stripped with no residue.

In an embodiment, the conductor can be a wire, and in this design is implemented in particular as a single piece. By contrast, in a likewise suitable variant, the conductor is a stranded conductor or a wire rope, and thus comprises, in particular, multiple wires that are twisted or stranded together, in particular. The abovementioned advantages with regard to the separation layer thus apply in particular for any embodiments of a conductor. Particularly in the case of a conductor made of multiple wires, its outward-facing surface is normally larger and also more inhomogeneous than that of a single-piece conductor, so a reduction or avoidance of adhesion is especially advantageous in this case.

In an embodiment, the cable has only one conductor and is thus constructed in the manner of an insulated wire that has a conductor, even a multi-wire conductor, directly enclosed in a wire insulation. Alternatively, however, multiple individual conductors can also be enclosed by the silicone sheath, wherein multiple conductors are separated together, in groups, or separately by one or even more separation layers that each enclose the conductor or the conductor groups in the manner of separating sleeves. In this way, a multi-conductor cable is formed, in particular.

In an embodiment, the cable additionally includes multiple subsidiary cables, which in turn are implemented as single-conductor or multi-conductor cables with a subsidiary cable sheath, in particular a silicone sheath. The multiple subsidiary cables are combined into a composite cable that has a common silicone sheath as the cable sheath. The individual subsidiary cables are separated from the common cable sheath by a common separation layer and/or are separated from one another by individual separating sleeves for each subsidiary cable, and thus advantageously can be stripped separately in an especially simple manner.

In order to manufacture the cable, generally the electrical conductor, for example a stranded conductor or a wire rope or as appropriate also a solid wire, can be enclosed in the separation layer made of the silicone material so that this separation layer is in direct contact with the conductor. The silicone sheath is additionally applied directly over the separation layer, which is to say enclosing it, and in particular is integrally joined thereto. The separation layer is then applied spatially between the conductor and the silicone sheath.

In an embodiment, first the separation layer is applied in an extrusion process, and is thus likewise located around the conductor, in the manner of a first inner silicone sheath. This prepared semifinished product is next equipped with the actual silicone sheath, which is now a second outer silicone sheath. In particular, the two silicone sheaths then bond together into the combined silicone sheath, which now advantageously can be removed from the conductor with no residue.

Alternatively, the two silicone sheaths, which is to say both the separation layer in the form of an inner silicone sheath and also the outer silicone sheath, are created in a combined co-extrusion process. Because of the similar materials of the two silicone sheaths, a co-extrusion of this nature is especially simple to carry out. This results in an especially compact manufacturing process, in particular with regard to the requisite tools and process steps.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates an example embodiment, showing a cable in cross section.

DETAILED DESCRIPTION

In the exemplary embodiment shown, a conductor 4, in particular a central conductor, is implemented in the cable 2 as a stranded conductor or wire rope and comprises a plurality of individual wires 6, which preferably are all made of aluminum or an aluminum alloy. They are enclosed by a non-adhering separation layer 8 made of a silicone material, which in this case is a silicone with added filler 9. Provided in particular as filler 9 is a pyrogenic silicic acid. Finally, the separation layer 8 is enclosed by a silicone sheath 10. Here, the latter has a significantly greater wall thickness in the radial direction than the separation layer 8. In the cable, the separation layer 8 and the silicone sheath 10 as inner or outer silicone sheath, respectively, form a combined silicone sheath 10 of the cable 2.

The filler 9 used in the exemplary embodiment is a so-called pyrogenic silicic acid, which has a density of approximately 2.2 g/cm$^3$, for example. In general, the proportion of filler 9 in the silicone material is in the range between 20 and 70%, in particular in the range between 30 and 60 percent by weight.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cable comprising:
an electrical conductor;
a silicone sheath surrounding the conductor; and
a separation layer arranged between the conductor and the silicone sheath, the separation layer being made of a silicone material that has a lower adhesion to the conductor than a material of the silicone sheath,
wherein at least one filler is added to the silicone material for the lower adhesion of the separation layer as compared with the silicone sheath, wherein either silicon dioxide or silicic acid is used as the filler with a proportion in the silicone material being in a range from 30 percent by weight to a maximum of 60 percent by weight, and wherein an identical heat curing silicone based on diorgano(poly)siloxanes is used for the silicone material and for the silicone sheath so that the silicone sheath and the separation layer differ only by the filler, and
wherein the separation layer directly contacts the conductor and the silicone sheath forms the outermost layer of the cable.

2. The cable according to claim 1, wherein the separation layer is integrally joined to the silicone sheath.

3. The cable according to claim 1, wherein the silicone material has a higher density than the silicone sheath.

4. The cable according to claim 1, wherein the silicone material has a density in a range from approximately 1.5-1.8 g/cm$^3$.

5. The cable according to claim 1, wherein the conductor is made of aluminum or an aluminum alloy.

6. The cable according to claim 1, wherein the conductor is a stranded conductor.

7. The cable according to claim 1, wherein silicic acid is used as the filler, the silicic acid being pyrogenic silicic acid.

* * * * *